United States Patent
Giardina

[15] 3,651,789
[45] Mar. 28, 1972

[54] STEAM GENERATOR

[72] Inventor: Angelo Robert Giardina, Bromall, Pa.
[73] Assignee: Westinghouse Electric Corporation, Pittsburgh, Pa.
[22] Filed: June 13, 1968
[21] Appl. No.: 736,777

[52] U.S. Cl. .................................... 122/32, 165/163
[51] Int. Cl. ................................................ F22b 1/02
[58] Field of Search .............. 122/32, 34; 165/157, 160, 161, 165/163

[56] References Cited

UNITED STATES PATENTS

| | | | |
|---|---|---|---|
| 3,012,547 | 12/1961 | Ostergaard et al. | 122/32 |
| 2,518,270 | 8/1950 | Barr | 122/332 X |
| 3,338,301 | 8/1967 | Romanos | 122/32 X |

FOREIGN PATENTS OR APPLICATIONS

| | | | |
|---|---|---|---|
| 822,430 | 10/1959 | Great Britain | 122/32 |
| 1,066,972 | 4/1967 | Great Britain | 122/32 |

Primary Examiner—Kenneth W. Sprague
Attorney—A. T. Stratton, F. P. Lyle and F. Cristiano, Jr.

[57] ABSTRACT

A compact liquid-metal heated vapor generator 21 whose liquid metal is typically sodium and whose secondary fluid is water. The water is conducted through tubes 29 of serpentine configuration with the serpentine turns nested in trombone-slide relationship. The tubes 29 are in separate modular bundles 27 and the modules extend throughout the interior of the pressure vessel 22. The modules 27 are separated into separate sections by support plates or baffles 44 and each module has a separate inlet 50 and outlet 52 for its tubes 29. The distribution of the sodium over the tubes 29 is effected by conducting the sodium from its inlet through a pool and introducing reverse flow (see arrows 84) of the sodium before it impinges on the modules 27. The tubes 29 of each module are sealed through separate tube sheets 54 (FIG. 3), at the feedwater inlet 50 and the vapor outlet 52 and feed water is admitted and the steam derived through separate nozzles 66, respectively, for each module.

13 Claims, 3 Drawing Figures

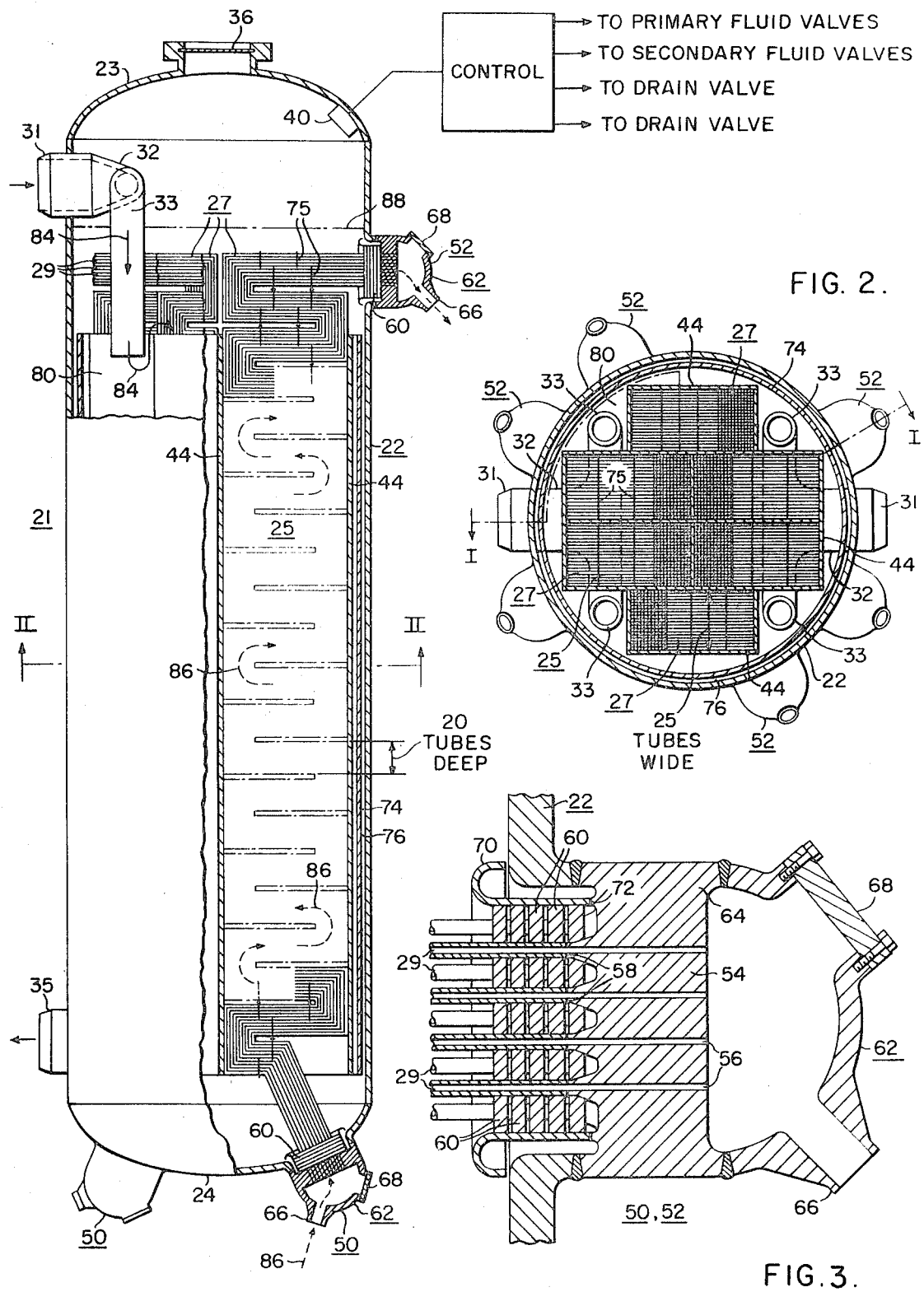

STEAM GENERATOR

CROSS-REFERENCE TO RELATED APPLICATIONS

This application relates to liquid-metal heated vapor generators such as are disclosed in an application (here in called "Stahl application") Ser. No. 735,598, filed June 10, 1968, in behalf of William F. Stahl and assigned to Westinghouse Electric Corp. and identified by this assignee as Case 35,387 (in the upper right-hand corner of each page of the specification). The Stahl application is incorporated herein by reference.

The Stahl application discloses a liquid-metal heated vapor generator which, in the interest of concreteness, may be described as a vertically oriented sodium-tube-and-shell steam generator in which the heating fluid is high-temperature sodium circulating downwardly on the shell side outside the tubes and water/steam flows upward through multi-pass reverse bend tubes or tubes of serpentine configuration nested in trombone-slide relationship in compact bundles or modules. The main problems faced in providing such a sodium-steam generator are as follows:

1. Sodium-water reaction must be avoided to the extent practicable and provisions must be made for a harmless release of energy if such a reaction does occur.
2. The effects of severe thermal gradients and shocks must be minimized.
3. The flow distribution of the primary fluid (sodium) must be such as to effectively heat the secondary fluid (water).
4. The cost of the generator considering its life, down-time and repair demands must be reasonable.

Prior to Stahl's invention attempts were made to provide vapor generators of this type by borrowing from conventional boiler and heat exchanger practice and art. To guard against sodium-water reaction, double tubes and double tube sheets with an inert third fluid interposed between the walls were employed. The resulting elaborate designs were self-defeating, since the resulting mechanical complexity made fabrication difficult, quality control a challenge and field repair nearly impossible. The cost was high at each stage.

Another attempt was the Enrico Fermi Atomic Power Plant, EFAPP. In the reactor, sodium flow was downwardly on the shell side and water/steam flowed through the tubes. Ferritic material was employed throughout and both water and steam side tube sheets were located at the top of the unit in an inert gas space. In this steam generator, much of the tube length proved to be ineffective in heat transfer and field tube repair was not possible without a major disassembly of the steam generator.

In another attempt, the secondary fluid was conducted through a vertical cylindrical unit of essentially straight tubing having bent portions of sine-wave form to accommodate differential expansion. Again sodium flow was downwardly on the shell side and water-steam flowed through the tubes. Stainless steel was used throughout except for the tubes; the tubes were bimetallic tubing -- a metallurgically bonded Inconel with a stainless exterior. The manufacture of the bimetallic tube and its subsequent fabrication difficulties imposed a prohibitive cost burden.

In a still other attempt, a further unit was designed; also vertically oriented with once through forced circulation and sodium counter-flow. The unit is about 76 feet high and 13 feet in diameter. It consists of helical ferritic evaporator and austenitic stainless steel superheater tube bundles. The helical-coil tube design requires very long tubes (much longer than commercially available from tube mills for the diameter required to transmit adequate vapor); hence six welds are required to make each tube length. The evaporator and superheater tube bundles have separate inlet and outlet flat tube sheets connected through individual channel heads and externally welded pipe. These tube sheets are located in the upper portion of the unit in the inert gas space; hence much of the tube length is ineffective and also it is difficult to drain the water side of the unit. The unit is difficult to fabricate and of high cost.

The generator of the Stahl application includes a vessel having tube bundles each of which has a plurality of tubes of serpentine configuration nested in trombone-slide relationship. These modules extend throughout the interior of the vessel. The generator disclosed by Stahl meets the above listed conditions 1 through 4, but it has been found in considering this generator that it lends itself to material improvement. In particular it is desirable to minimize the damage which may occur to the relatively thin secondary-fluid tubes of the generator and to minimize and localize the damage to the secondary fluid tubing as a whole when a leak occurs. It is also desirable to minimize the reconstruction or replacement necessary on the occurrence of a leak and the time necessary for reconstruction and replacement. It is an object of this invention to make the above-described improvements and to provide a liquid-metal heated vapor generator whose incidence of damage shall be minimized and localized, and the effort and labor expended on whose repair or reconstruction shall be minimized.

In accordance with this invention, a generator is provided in which the secondary fluid is conducted by tubes subdivided into like separate modules. The tubes of each module are of multi-pass reverse-bend, or serpentine, form similar to the tubes of the Stahl application and are nested in trombone-slide relationship like Stahl's. But the modules are separate, having separate secondary-fluid inlets and vapor outlets, and are separately removable as separate units. The tubes are enclosed in shells formed by strong baffles or plates. The shells are open at the top and bottom permitting the liquid-metal to pass in intimate heat-exchange relationship with the tubes. The shells confine the gas pressure generated by leakage of a tube within any shell to the tube in this shell and prevent damage to the tubes in the other modules.

The separate modules are nested in the generator vessel. Each module has a portion extending to the outside or outer periphery of the vessel. The removal of any module then requires only that an opening be provided in the area of the vessel to which the module extends and the removal of this module with its inlet and outlet. The cost and complexity of replacement is minimized.

An aspect of this invention arises from the realization that the thin tubes which conduct the secondary fluid would be damaged by the direct impingement on them of the liquid metal. Typically the liquid metal enters the inlets to the vessel at the rate of about 20 feet per second. It has been realized that the direct impingement on the secondary-fluid tubes of liquid metal moving at this rate would produce vibrations in the tubes and the resulting fatigue would cause the tubes to become perforated and leak. In accordance with this invention, the liquid metal is conducted from the inlets at a position displaced from the tubes and goes through a reversal in direction before impinging on the tubes. In a vertically oriented generator the liquid metal initially flows downwardly from the inlets and the reversal of direction results in upward flow. The flow of the liquid metal is then reduced to about 3 or 4 feet per second so that vibrations and resulting damage to the tubes are suppressed. The pressure drop across the liquid metal in heat-exchange relationship with the tubes remains at the required 10 or 12 pounds per square inch. In addition, the surfaces of the tubes adjacent the inlets are submerged in a pool of liquid metal. The inflowing liquid metal is submerged below the surface of this pool and reverses its direction under this surface so that the tubes are gently washed by the liquid metal in intimate heat-exchange relationship, but without appreciable impact.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 1 is a vertical view taken generally along lines I—I of FIG. 2, with the upper portion broken away, to show internal detail, of a liquid-metal heated vapor generator in accordance with this invention;

FIG. 2 is a view in transverse section taken along line II–II of FIG. 1; and

FIG. 3 is an enlarged view in section of one of the tube-plate-and-channel heads (either on the vapor-outlet or secondary-liquid inlet side) which are connected to separate secondary-fluid tube modules.

In the interest of facilitating the understanding of this invention the labelling of the Stahl application is here adopted to the extent practicable. Like or analogous parts are labelled in the same way that they are labelled in the Stahl application.

DESCRIPTION OF THE PREFERRED EMBODIMENT

The apparatus shown in the drawings is a once-through vapor generator 21 of the vertical-shell-and-tube type. The apparatus includes a generally cylindrical pressure vessel 22 closed by upper and lower hemispherical domes 23 and 24 typically integral with the remainder of the vessel. The vessel 21 is composed of corrosion-resistant material (typically AISI 316 stainless steel, where the primary fluid is sodium). Within the vessel 21 there is an assembly 25 of modular tube bundles 27 each including a plurality of tubes 29 (Fig. 3) of planar serpentine configuration nested in trombone-slide-like relationship. The vessel 22, has a pair of lined liquid-metal inlets 31 which are generally diametrically opposed.

Each of the inlets 31 is connected through a T-joint 32 to a pair of tubular conductors 33 which extend downwardly and open into the vessel 22 near the periphery of the vessel at substantially uniformly spaced regions of the cross section of the vessel (FIG. 2).

The vessel 22 also has a pair of diametrically opposed liquid-metal outlets or nozzle 35 (only one shown). These outlets are preferably lined conduct the liquid metal, after transfer of heat, to heaters (not shown) for reheating and recirculation.

At its apex a rupturable disc 36 is sealed to the dome 23. This disc is adapted to be ruptured by the pressure of the gas (hydrogen in the case of liquid sodium) which is generated and rapidly builds up in the generator in the eventuality of a leakage in the secondary-fluid (water) conductors 29. The disc 36 ruptures at a substantially lower pressure than would shatter, or even materially damage, the apparatus as a whole. The dome 23 also includes a pressure-responsive device 40 which is connected to a control 42. When pressure builds up as a result of a leak in tubes 29 the device 40 actuates the control 42 to close the primary and secondary fluid valves (not shown) and to open the liquid-metal and secondary fluid drainage valves (not shown) so that all flow through the generator 21 is stopped and the vessel 22 and tubes 29 are drained.

The tube-bank modules 27 are alike. Each module 27 is of generally rectangular cross section and includes a plurality of sets of serpentine tubes 29 nested in trombone-slide relationship in a vertical plane. Each module 27 includes a number of such planes of tubes 29. Typically the number of tubes 29 in each vertical plane of tubes is 20 and each module is 25 planes wide. There are thus typically 500 tubes in each module 27. (See FIGS. 1 and 2).

Each module 27 is enclosed in a rectangular shell of plates or baffles 44. These plates 44 are of substantial thickness and strength and separate each module 27 from those adjacent to it. The gas pressure developed from leakage in one module is localized in this module and does not damage the tubes in the other modules. The shells are open at the top and bottom to permit unrestricted flow of the primary fluid. The plates 44 direct and contain the liquid-metal flow permitting stable operation and minimizing any tendency for the liquid metal to stratify.

As disclosed in the Stahl application the tubes 29 are supported by notched plates (75 Stahl FIGS. 5 and 6) attached to cross rods (77 Stahl) which traverse the tube banks. These rods are supported by, and tie together, the vertical plates 44 forming the shell.

Each module 27 is combined into a separate integral unit with a separate secondary-fluid tube-plate and channel-head inlet 50 and a separate vapor tube-plate and channel-head outlet 52 (Fig. 3). The inlets 50 and outlets 52 are alike. Each includes a perforated tube plate or tube sheet 54 through whose holes 56 the tubes 29 of the module 27 are sealed pressure tight. The sheet 54 and the joints 58 to the sheet are protected by shielding plates or blocks 60. The joints 58 and the shielding 60 may be as disclosed in the Stahl application. (The seals 58 may also be of the type disclosed in FIG. 5 Schlichting U.S. Pat. No. 3,112,735, which are physically separated from the liquid metal.)

Each inlet 50 or outlet 52 includes a generally hemispherical channel head 62 which is welded to an annulus 64 extending integrally from the tube sheet 54. The channel head 62 includes a nozzle 66 for admitting secondary fluid or emitting vapor and an access opening sealed pressure tight by a plate 68.

The modules 27 are nested side-by-side in the cross section of the vessel 22 (FIG. 2) with the secondary-fluid inlet and outlet sealed or welded pressure-tight to the walls of the vessel 22 FIGS. 1 and 3. The separate secondary-fluid tube-plate and channel head inlets 50 are sealed through the lower dome 24 and the outlets 52 are sealed through the upper portions of the side walls of the vessel. As illustrated, the generator includes six modules 27. The six inlets 50 are distributed substantially uniformly around the dome 24 and the outlets 52 around the vessel 22 near the top. A part of each module 27 extends to the outer periphery of the vessel. Any of the modules can then be bodily removed, without disturbing the others, by opening the part of the vessel including the module and its inlet 50 and outlet 52. A leaking module to be removed may be identified by the decrease in liquid pressure in its tubes.

Each tube-to-tube-plate assembly is protected by an annular shield 70 which extends around the tubes 29 and their joints to the sheets 58. The shield 70 is welded to an annular projection 72 from the tube sheet 54. The nested modules 27 are enclosed in a cylindrical shield 74 (FIGS. 1 and 2) whose weight is carried by the plates 44 and which is in turn supported by the shell 22 in any suitable manner (not shown). There is an annulus 76 of stagnant sodium around shield 74 during operation.

There are symmetrically disposed longitudinal spaces or boxes 80 defined by the plates 44 of each end module 27 and an adjacent interior module 27. The conductors 33 from the T-joints 32 extend into these spaces 80 to a position below the tops of the modules 27. The flow of the liquid metal through these conductors 33 and out of them is represented by solid lined arrows 84. The flow of the secondary fluid is represented by broken-line arrows 86. The status of the secondary fluid and the various regions is presented on FIG. 1.

The liquid metal is at a level 88, above the tops of the modules 27. Thus the outlets of the conductors 33 are submerged. The metal flows out of conductors 33 into this pool and, reversing its direction, flows over the tubes 27 of the modules. The tube-plate and Channel-head inlets are under a stagnant pool of liquid metal. Above the level 88 there is an atmosphere of an inert gas under pressure.

Typically there is provided, in the practice of this invention, a heat exchanger or vapor generator, with sodium as primary fluid and water as secondary fluid, having a capability of 1,000 Megawatts thermal, expressed MWT, with an overall length of about 50 feet and a diameter of 10 feet. The invention may, of course, also be applied to any reasonable size unit and has been proposed for units ranging from 200 to 1,700 MWT. Sodium flows downwardly on the shell side and water/steam flows upward through the multi-pass reverse bend tubing 29; optimum counterflow is thus achieved.

As disclosed by Stahl, the steam generator shell, tube plates and internals are constructed of stainless steel. The tubes are preferably of Incoloy 800, an austenitic allow possessing good resistance to mass transfer in a sodium environment and chloride stress corrosion in water/steam. The use of this tube material compatible with both sodium and water systems eliminates the problems and cost associated with the prior-art bi-metallic tubes.

Six modules 27 are nested compactly with a 10 foot diameter of the shell 22. Typically each module 27 has a generally rectangular shape containing 500 ½ inches diameter tubes 29 (20 deep and 25 across top) in the multi-pass reverse bend shape; each tube 29 has an approximate length of 130 feet. (It is noteworthy that no welds are required in this length of tube.) Tubes of ½ inch diameter are available in lengths of 130 feet or more. (The prior art design described above requires six welds.)

Typically the tube plate 54 is circular and has a diameter of about 36 inches and a thickness of about 12 inches in the region where the 500 tubes 29 are sealed through it. The spacing between the tube centers (pitch) is about ⅞ inches. The nozzle 66 has a 6 inch diameter opening and access opening (68) has a diameter of 10 to 12 inches. The modules 27 may be built together completely as sub-assemblies reducing the manufacturing time cycle considerably.

In a sodium-water generator heat-transfer rates are high on both the sodium and steam sides of the tubes 29, the tube wall conduction resistance is then a major factor in determining the transfer surface required. By using small diameter tubes 29 (½ inches) the wall thickness required to contain pressure is also relatively small. Hence a small bundle volume results for each module 27; this limits the rate at which water can leak into the sodium, should a tube break occur.

Typically the pressure in the design conditions are as follows tubes 29 is about 3,000 pounds per square inch of area and the pressure in the vessel 22 is about 200 pounds per square inch of area. The pressure drop is about 225 pounds per square inch for the water and about 10 pounds per square inch for the sodium. The generator operates with the liquids at about 965° F.

In accordance with this invention, the tubes are spaced closely together, yet provide relatively large sodium flow areas resulting in the moderate sodium pressure drop. This results in a compact bundle which, in turn, results in a small unit diameter and correspondingly thinner shell walls. This feature, in turn, enhances the generator's ability to withstand thermal transients. A further advantage of this compactness yields an overall length for the shell of only 50 feet (compared to prior-art 1,000 MWT designs - which are 76 feet long); the generator 21 may be shipped to the plant site in one piece.

Concisely stated, some of the major advantages of this invention are as follows:

1. Since the bundles are sub-assembled into six like modules 27, the manufacturing cycle time is reduced considerably.

2. The compartmentalization of the shell offers a significant advantage in limiting the effects of a sodium-water accident. As an additional improvement blow-out type baffles 44 can be provided along side of each compartment to release explosion products into vent chambers to limit the resulting damage to one module.

3. Individual inlet and outlet tube sheets 54 are relatively small in diameter and their circular shape may be readily analyzed for pressure and thermal stress 4. The module construction permits isolation of any individual shell section by providing isolation valves on the water and steam chambers. 5. The module construction allows standardization of the individual bundles and permits the customer to stock modules as spares for the eventuality of operational difficulties.

6. The compact construction (only 10 feet diameter by 50 feet in length for 1,000 MWT) permits shipping of unit in one piece with minimum field work required. 7. There are no bolted connections on the shell 21.

8. Both the sodium and the water sides of unit are completely and readily drainable.

9. The tubes 29 are available as integral pieces in the lengths required and no butt welds on the tubing are required.

10. All the tube ends are readily accessible for inspection and repair.

11. A single tube material eliminates costly manufacturing problems.

12. Thermal expansion of tubes 29 is well accommodated.

13. Repetitive manufacturing operations are feasible - all tubes 29 are bent to identical shape - and the unit is readily assemble.

While a preferred embodiment of this invention has been disclosed, many modifications thereof are feasible. This invention then is not to be restricted except insofar as is necessitated by the spirit of the prior art.

I claim:

1. A liquid-metal heated vapor generator including a vessel having an inlet and an outlet for admitting and withdrawing a heated liquid metal, constituting a primary fluid, a plurality of separate modules, each module including a bundle of tubes having inlets and outlets and effective to conduct a secondary fluid to be vaporized extending throughout the interior of said containers, a separate perforated tube plate and channel head structure associated with each bundle of tubes at their inlets and outlets, said plate and channel head structures being disposed externally of said vessel and connected thereto in leakproof relation therewith, a separate secondary-fluid inlet and a separate secondary-fluid vapor outlet connected to each of said channel heads, and means connected to said liquid-metal inlet for distributing said liquid metals throughout the cross sections of said modules in intimate heat-exchange relationship with said tubes to vaporize the secondary fluid in said tubes.

2. The generator of claim 1 wherein the secondary fluid inlet and outlet of each module are common to the tubes of said last-named module.

3. The generator of claim 1 wherein the secondary fluid is conducted in generally counterflow relationship to the liquid metal.

4. The generator of claim 1 wherein the tubes of each module are enclosed in a separate shell separating the tubes of each module from those of the others but open at the ends to conduct freely the liquid-metal in intimate heat exchange relationship with the secondary fluid.

5. The generator of claim 1 wherein the vessel is a vertically extending tubular pressure vessel having upper liquid-metal inlet and lower liquid-metal outlet and the modules extend throughout the interior of the vessel and the tubes of each module have in common a lower secondary-fluid inlet and an upper vapor outlet.

6. A liquid-metal heated vapor generator comprising a vertically extending tubular pressure vessel having an upper and a lower inlet and outlet for admitting and withdrawing a heated liquid metal, constituting a primary fluid, tubes extending substantially throughout the interior of said vessel in a serpentine configuration for conducting a secondary fluid to be vaporized, each said tube having a lower tube inlet through which the secondary fluid is taken in, an upper tube outlet from which vapor is derived, and means for conducting the primary fluid in heat-exchange relationship with said tubes between said tube inlet and said tube outlet, said conducting means including means connected to said upper liquid-metal inlet for distributing said liquid metal substantially uniformly over said tubes adjacent said inlet, said distribution means including means for introducing a generally vertical flow path into said liquid metal before it impinges on said tubes to reduce the rate of flow of said liquid metal to a magnitude at which damage to said tube is avoided.

7. The generator of claim 6 wherein the surfaces of said tubes on which the liquid metal impinges are submerged in a pool of a liquid metal and the vertical flow path of the liquid metal is within said pool.

8. The generator of claim 7 wherein the tubes are divided into a plurality of separate modular bundles of tubes in separated compartments and the liquid metal is distributed among these separate modular bundles.

9. The generator of claim 1 wherein the modules are substantially alike, each having the same cross-sectional area as the others, said modules being mounted compactly in the cross section of the vessel, leaving box-like spaces substantially symmetrically distributed around the cross section of said vessel that are free of modules, the said generator including means connected to the liquid-metal inlet for distributing the liquid metal over the tubes of the modules, the said distributing means conducting the liquid metal into said spaces in a manner to undergo a reversal in flow in said spaces and following said reversal flowing over said tubes.

10. The generator of claim 9 wherein the region in the spaces where the liquid metal is conducted by the distributing means is under a pool of liquid metal and the conducted liquid metal enters the said spaces under the surfaces of said pool.

11. The generator of claim 1 wherein each of the separate bundles extends to the outer periphery of the vessel and may be removed and replaced through an opening in the vessel to which it extends 12. A liquid-metal heated vapor generator including a vessel having an inlet and an outlet for admitting and withdrawing a heated liquid metal, constituting a primary fluid, a plurality of separate modules, each module including a plurality of tubes for conducting a secondary fluid to be vaporized extending throughout the interior of said containers, a separate secondary-fluid inlet and a separate secondary-fluid vapor outlet connected to each of said modules, means connected to said liquid-metal inlet for distributing said liquid metals throughout the cross sections of said modules in intimate heat-exchange relationship with said tubes to vaporize the secondary fluid in said tubes, contact between the liquid metal and secondary fluid being effective to produce a reaction one of whose products is a gas, said generator including means responsive to the pressure of said gas produced on the occurrence of a leak in a secondary-fluid tube of a module, for interrupting the flow of liquid metal through said container and secondary fluid through said tubes and for drawing the liquid metal and secondary fluid from said container and tubes respectively.

13. A liquid-metal heated vapor generator including a vessel having an inlet and an outlet for admitting and withdrawing a heated liquid metal, constituting a primary fluid, a plurality of separate modules, each module including a plurality of tubes for conducting a secondary fluid to be vaporized extending throughout the interior of said containers, a separate secondary-fluid inlet and a separate secondary-fluid vapor outlet connected to each of said modules, the tubes of each module being of multi-pass reverse bend shape and being nested compactly in the module in trombone-slide relationship, and means connected to said liquid-metal inlet for distributing said liquid metals throughout the cross-sections of said modules in intimate heat-exchange relationship with said tubes to vaporize the secondary fluid in said tubes.

* * * * *